United States Patent

Smadar

[15] 3,650,766

[45] Mar. 21, 1972

[54] EXTRUDED FOOD PRODUCTS AND METHOD OF PRODUCING SAME

[72] Inventor: Yechiel Smadar, New York, N.Y.

[73] Assignee: DCA Food Industries, Inc., New York, N.Y.

[22] Filed: July 7, 1969

[21] Appl. No.: 839,191

[52] U.S. Cl. ..................................99/100, 99/83, 99/168
[51] Int. Cl. ..........................................................A23l 1/00
[58] Field of Search ..................................99/1–14, 83–86, 99/100, 101, 103, 105, 131, 154, 182–193, 199, 204, 352, 108; 107/54

[56] References Cited

UNITED STATES PATENTS

| | | | |
|---|---|---|---|
| 2,205,094 | 6/1940 | Hammond | 99/182 X |
| 2,531,431 | 11/1950 | Hills | 99/100 |
| 2,771,370 | 11/1956 | Allen | 99/193 |
| 2,791,508 | 5/1957 | Rivoche | 99/103 X |
| 2,992,925 | 7/1961 | Green et al. | 99/131 |
| 3,257,214 | 6/1966 | McDermott | 99/182 X |

FOREIGN PATENTS OR APPLICATIONS

| | | | |
|---|---|---|---|
| 932,847 | 7/1963 | Great Britain | 99/100 |
| 586,157 | 3/1947 | Great Britain | 99/100 |

*Primary Examiner*—Norman Yudkoff
*Assistant Examiner*—Curtis P. Ribando
*Attorney*—Amster & Rothstein

[57] ABSTRACT

Food products may be manufactured in any shape or size by a process including the steps of forming an extrudable slurry of a food material, extruding the slurry and forming a gel-like skin around the extruded product. The skin is formed by subjecting gellable materials such as alginates to the action of gellation agents such as alkaline earth ions, at the surface of the extrusion product. The products may be subjected to further processing including coating, cooking, baking, frying, freezing or the like. In one embodiment the process may be employed to form uniform French fried onion rings.

15 Claims, 3 Drawing Figures

Patented March 21, 1972
3,650,766
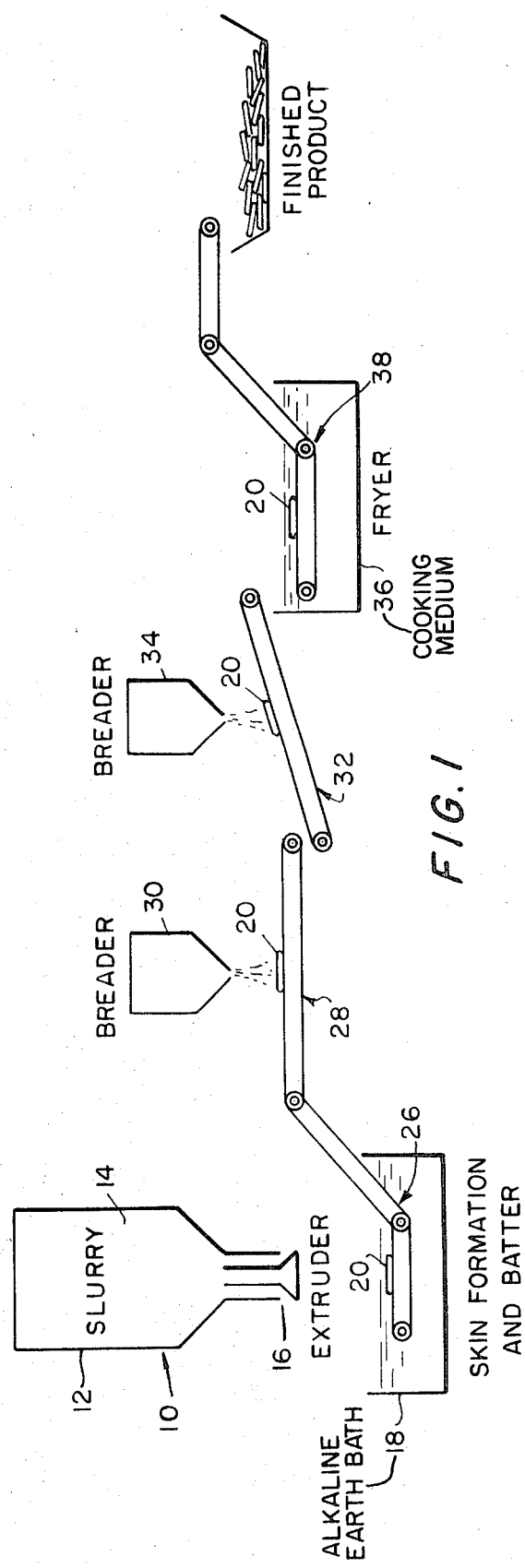
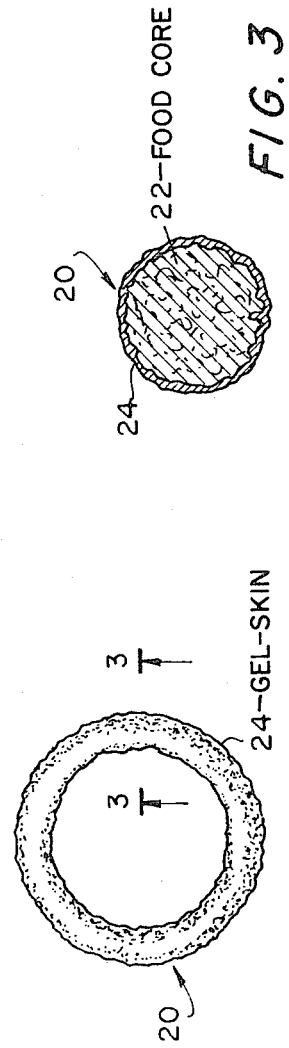
INVENTOR.
YECHIEL SMADAR
BY
*Amster & Rothstein*
ATTORNEYS

EXTRUDED FOOD PRODUCTS AND METHOD OF PRODUCING SAME

This invention relates to edible products and a method of manufacturing such products. More particularly, the present invention is concerned with the production of food products in a variety of shapes and sizes without particular regard to the original shape of the starting food while retaining the eating characteristics of the product in its natural state.

There is a large demand for prepared convenience foods, which require a minimum of cooking or other preparation by the consumer whether in a restaurant or in the home. In the mass manufacture of prepared food products, substantial difficulty is often encountered due to the variation in the sizes or shapes of the natural state of the food. These variations lead to increased costs, both in the original sorting of unsuitable sizes and in subsequent processing and handling of such foods. Attempts have been made to solve this problem by reducing the natural food to a chopped, powdered or other comminuted form and extruding the finely-divided product into a uniform shape. Normally, such extruded products are incapable of retaining a shape and the comminuted food must be admixed with a gellation agent which, when treated, acts as a structure-forming matrix throughout the shaped-food product. Such processes do not result in a fully acceptable product since the structure-forming matrix affects the texture and eating characteristics of the food product.

Both the size and shape problems are particularly acute with respect to the production of French fried onion rings. In prior art processes, such onion rings are manufactured by peeling whole onions, slicing them longitudinally and separating the longitudinal slices into the individual natural rings which are formed during the growing process. These rings of varying size are washed, dipped in a starchy batter, breaded and fried in deep fat or baked. Due to the nonuniform size of the natural onion rings, there is a significant amount of waste product and serious difficulties are encountered with respect to the sorting and handling of the nonuniform rings which greatly increase the cost of the product to the consumer. In addition to the handling difficulties, onion rings produced in this manner have not been satisfactory due to the "ballooning" and separation of the cooked breading and batter from the onion, so that when eaten, the cooked onion is often pulled out of the surrounding shell of fried breading material and the desired eating experience of a crispy fried product is not obtained.

It is an object of the present invention to provide prepared food products which can be made in any desired shape or size but which still maintain eating characteristics comparable to a food prepared in its naturally occurring state.

It is another object of this invention to provide a method of manufacturing relatively uniform food products in any desired shape while retaining the eating characteristics of the natural food product.

Yet another object of this invention is to provide a novel French fried onion ring product and a method of producing the same in which the breading or other edible coating is securely adhered to the surface of the ring.

It has now been discovered that prepared food products having any desired size or shape may be formed from a slurry containing the food product in comminuted form, extruding or otherwise molding or shaping the food product and maintaining the shape of the food product by forming a thin skin on the outer surface of the shaped food product. The method of the present invention may be applied to a wide variety of foods and is not dependent upon the acidity of the foods or upon temperature. The formed food products may be subjected to further processing steps depending upon the nature of the final product, for example, breading, coating, frying, baking and the like without the loss of its shape due to the presence of the skin. Moreover, the skin provides an appropriate surface for the application of a coating, such as a breading, since the relatively continuous skin provides a stable base for a bond between the food core and the outer breading thereby avoiding the ballooning and separation problem associated with breaded and fried products of the prior art.

The invention will be further understood by reference to the following detailed description when taken in conjunction with the accompanying drawings, wherein:

FIG. 1 is a schematic view of an apparatus for forming extruded products in accordance with the present invention;

FIG. 2 is a plan view of an extruded ring product in accordance with the present invention; and FIG. 3 is a cross-sectional view of the product illustrated in FIG. 2.

The novel method of the present invention may be employed to form a wide variety of novel prepared food items. Thus, in addition to the formation of onion rings, the method disclosed herein is applicable to the formation of fruit, vegetable, meat, poultry, fish or dairy products and mixtures thereof of any desired shape. In each instance the natural food material is converted to a finely-divided mass; extruded, molded or otherwise formed into any desired shape including rings, nuggets, patties and the like; treated to form a retaining skin around the outer periphery of the molded food product; and subsequently further processed in any fashion desired. For example, the molded product having the skin formed thereon may be subsequently battered, breaded and baked or fried; coated with a glaze or frosting such as chocolate, a sugar composition or a wide variety of other confectionery materials; surrounded with a pastry shell and baked to form a pie; cooled or frozen; or otherwise treated to form any desired form of food product. Typical examples of food products which can be made using the novel method of the present invention include fish sticks, vegetable rings, meat or fowl nugget, "egg roll" type products, fruit rings or pies and ice cream products. Although the use of naturally occurring foods as a starting material is a preferred form of the invention, the method described herein may also be applied to form artificial food products by employing artificial flavors and edible bulk forming materials.

Regardless of the natural or artificial food material selected as the starting material, it is first formed into an extrudable or moldable slurry. The major ingredient of the slurry is small food particles, i.e., particles in a powdered, shredded, chopped, pulverized or otherwise comminuted form, for example, chopped onions. Additional edible slurry forming materials such as dry binders and liquids, are added to the mass of finely divided food to give it a moldable consistency. The selection of the particular slurry forming materials is dependent upon the particular food product being prepared. Thus, for example, where an onion ring is the desired product the binder may comprise a cookable flour and water. The mixture will have a pastelike consistency suitable for molding but when subsequently processed, e.g., by cooking or frying, will result in a product having desirable eating characteristics. A wide variety of binders and liquids may be employed in addition to flour and water to form the slurry, for example, gelatinous materials, starches, carbohydrates, corn meal, and the like. The slurry may also contain flavor enhancers including artificial flavors corresponding to the flavor of the natural food product to insure uniformity of taste; seasonings, such as salt, pepper and the like; and natural or artificial sweeteners, coloring agents and preservatives.

The formation of a shape retaining outer structure or skin on the extruded food mass is a critical feature of the invention. In general, the settable materials contemplated by the present invention are selected from a class of materials which form viscous colloidal solutions in water but, when treated with a setting agent form a relatively impervious gel-like structure. These materials are further characterized by their heat irreversibility after treatment, i.e., they remain intact as a gel-like skin even when subjected to frying or baking temperatures. Included within this class are such materials as methyl cellulose and derivatives of methyl cellulose carboxymethyl cellulose and hydroxy-methyl cellulose; casein; algins; alginates; pectins and methoxy pectins. Particularly preferred materials for use in the present invention are alginate salts such as sodium alginate.

The amount of the skin-forming material used to form the skin will depend upon the nature of the slurry. Thus, if the slurry is a relatively fluid mass a greater amount of skin-forming material will be employed to insure the retention of shape. Where the slurry is more viscous, a smaller amount of the skin-forming material will be employed. In either event, the texture and consistency of the slurry will be independent of the skin. Typical amounts of skin-forming material would be in the range of 0.01 to 2 weight percent of the slurry although higher amounts up to 10 weight percent may be employed.

The strength of the skin can also be controlled by varying the concentration of the alkaline earth ion in the setting or gelation solution. Thus, by controlling the ion concentration and/or the exposure time and/or the amount of skin-forming material in the slurry and depending upon the processing conditions and the food content of the slurry varying skin strengths may be established in accordance with product requirements.

The gel-forming materials are converted to a heat irreversible gel structure by contact with a setting solution which provides a source of alkaline earth metal ions, such as magnesium and preferably calcium ions. A wide variety of salts may be employed as the source of alkaline earth ions. Typical salts include calcium or magnesium chlorides, carbonates, lactates and phosphates. However, any other alkaline earth salts which will provide a source of the metal ions may be employed.

In one method of forming the gel skin, the heretofore described slurry of the food product is extruded or otherwise molded into the desired shape and its outer surface is sprayed or otherwise washed with a solution containing the skin forming material. The formed food product coated with the solution is then contacted with a source of alkaline earth ions, for example, by contact with a spray or bath containing such ions. As the alkaline earth ions contact the skin-forming solution, a continuous gel-like skin is immediately formed, in situ, on the surface of the shaped food product while the inner core of food product remains as a flowable mass. The product shape is retained throughout subsequent processing steps since the skin forms a stable structure which remains intact and confines the flowable mass throughout subsequent processing steps.

In a preferred method of preparing the food products of the present invention, the skin-forming material is directly added to the slurry and the skin is formed in situ by subsequently contacting the slurry with a source of alkaline earth ions. Despite the presence of the skin-forming material in the extrudable slurry, the slurry can be premixed and stored prior to extrusion without any adverse effect. Storage times would, of course, be dependent on the keeping qualities of the natural foods embodied in the slurry. The slurry containing the skin-forming material is ultimately extruded and contacted with a source of alkaline earth ions which causes an impervious gel skin structure to immediately form on the outer surfaces of the shaped food. This impervious structure prevents the alkaline earth ions from penetrating into the interior portion of the food mass and thereby prevents the formation of a gel-like matrix structure within the interior of the food product. Moreover, in a preferred embodiment the contact time between the formed food product and the source of alkaline earth ions is of relatively short duration and is maintained for a time sufficient to form only a skin without further penetration of the food mass. Typical contact times would range between 1 second and 5 minutes, although longer contact times may be used if desired.

FIGS. 1–3 illustrate the details of an apparatus for carrying out the novel method of the present invention to form novel food products having an elemental shape. The details of one type of apparatus are described and claimed in the copending, commonly assigned, application U.S. Ser. No. 879,173 in the name of Yechiel Smadar et al. and entitled "Method and Apparatus for Preparing Food Products" filed concurrently with the present application. The apparatus depicted in that application is particularly useful in the formation of onion rings in accordance with the present invention, although it can be used to make any ring product.

Referring more specifically to the drawings, there is generally shown in FIG. 1 an extrusion apparatus 10 connected to a hopper 12 containing a comminuted food product 14 comprising an extrudable slurry of food product mixed with suitable binders. For example, a mixture containing a major amount of diced onions and a minor amount of flour and water. The slurry also contains a minor amount of a gel-forming substance such as sodium alginate. The mixture is extruded in any desired shape, for example, a torroidal or ring shape through extrusion nozzle 16 and drops into a bath 18 containing a source of alkaline earth metal ions which cause the formation of a skin around the extruded slurry. If desired, the extrusion nozzle may be positioned beneath the surface of the bath so that skin formation occurs simultaneously with formation of the extruded product. Alternatively the extrusion nozzle may be provided with a washing mechanism which causes skin formation around the extruded slurry and also aids in the release of successive extrusions from the nozzle. FIGS. 2 and 3 illustrate a food ring formed in the apparatus of FIG. 1. The food ring 20 consists of an inner core 22 of the extrudable slurry and an outer skin 24 formed by contracting the food ring containing the gel-forming material with a source of alkaline earth ions either as the ring was formed at the extrusion head or in the bath.

FIG. 1 also schematically illustrates the manner in which the processing of a fried food product such as an onion ring may be completed. The bath containing the gellation or setting agent may also contain a conventional batter which provides a breading surface on the gel skin. The food ring passes through the bath on conveyor 26 where it is battered and then to a second conveyor 28 which passes beneath a first breading station 30 where one side of the ring is coated with a conventional breading. The breaded ring falls from the end of conveyor 30 onto a third conveyor 32 which passes beneath a second breading station 34. In falling from the end of the second conveyor the ring will flip over and present its unbreaded side for breading at the second breading station.

Upon completion of the breading procedure, the food ring may be cooked, for example, by passing through a fryer 36 on a fourth conveyor 38 to form a crisp outer coating and a stabilized inner core of the cooked food product in intimate contact with each other.

EXAMPLE 1

Eight pounds of diced fresh onions were mixed with 1.1 pounds of wheat flour, 0.23 pounds of salt, 0.44 pounds of sugar and 0.23 pounds of a 10 percent aqueous sodium alginate solution. The ingredients were thoroughly mixed to form a slurry and were fed to an extrusion apparatus. As each ring was formed and cut at the nozzle of the extrusion apparatus, its outer surfaces were washed with a solution of calcium chloride. The washing action caused the formation of a gel-like skin on the surface of the ring. The skin was subsequently broken by purposely tearing a portion of its surface and the inner core was examined. Examination of the inner core revealed a flowable ungelled slurry of the original chopped onion mix and the complete absence of any internal gelled matrix.

EXAMPLE 2

An onion ring prepared as described in Example 1 was coated with a batter in a bath containing 454 grams of a batter mix, 12 grams of calcium chloride and 690 grams of water. The ring was subsequently provided with a coating of breading and fried at a temperature of 375° for a period of 1 minute.

An examination of the fried ring revealed that the breading was in intimate contact with the outer surface of the gel skin surrounding the onion ring.

EXAMPLE 3

The procedure of Example 1 is repeated employing a food mass comprising two pounds of wheat flour, three pounds of sugar, 2.5 pounds of corn starch, 0.5 pounds onion powder, 0.2 pounds salt, 0.4 pounds propylene glycol, 0.02 pounds sodium alginate and 1.2 pounds water. The extruded mass has a gel-like skin on its outer surface, which, upon tearing, reveals an ungelled inner slurry. This example illustrates that the method of the present invention may be employed to form synthetic food products such as artificial onion rings.

It is an additional feature of the present invention that the slurry forming materials used to prepare the extruded comminuted food products may be premixed and stored or shipped in dry form and mixed with the comminuted food product as needed. Such a procedure is advantageous since the natural food products ordinarily have a relatively short shelf life as compared to the remainder of the materials in the matrix or slurry. Typical ingredients in the matrix mix would include the following materials, the weight per cent amounts given with each material representing the broad range and preferred amounts of materials:

|  | Preferred | Range |
| --- | --- | --- |
| Wheat Flour | 40 wt. % | 30–60 |
| Corn Meal | 40 | 30–60 |
| Sugar | 15 | 10–30 |
| Sodium Alginate | 5 | 4–10 |
| Salt (optional) | — | 0–15 |

When a slurry is formed from the above described matrix premix it will comprise 10 to 15 weight percent of the slurry, the remainder being the comminuted food product. The natural juices of the food product may provide sufficient fluid for the formation of the slurry. Alternatively, a minor amount of water may be added.

The setting solution containing the source of alkaline earth ions for in situ formation of a skin on the extruded product may also be advantageously premixed in dry form and converted to a solution as needed. A typical premix for a setting solution including a batter would comprise the following materials:

|  | Preferred | Range |
| --- | --- | --- |
| Corn Flour | 55 Wt. % | 50–60 Wt. % |
| Wheat Flour | 35 | 30–50 |
| Calcium Chloride | 1.0 | 0.5–3.0 |
| Salt (optional) | 5.0 | 0–6.0 |
| Dry Whey (optional) | 3.0 | 0–6.0 |
| Soy Flour (optional) | 0.23 | 0–1.0 |
| Nonfat dry milk (optional) | 0.07 | 0–1 |
| Dried whole egg (optional) | 0.07 | 0–1 |
| Mono Sodium Glutamate (optional) | 0.07 | 0–0.5 |
| Spice (optional) | 1.0 | 0–0.1 |

Water is added to the above described dry mix setting solution to form either a high or low viscosity solution as determined by product requirements. A high viscosity solution will result from mixing equal parts of mix and water while acceptable lower viscosity solutions may be formed by mixing one part of the dry mix with 2–4 parts of water.

Having described the general nature as well as specific embodiments of the invention, the true scope of the invention will now be pointed in the appended claims.

What is claimed is:

1. A manufactured food product comprising an extruded heat stabilized core of a flowable slurry including comminuted food particles, a cookable binder and an ungelled, gel-forming material that normally forms a gel upon exposure to a gelation agent, a skin surrounding and confining said core, said skin being formed from said gel-forming material by the exposure of the surface of said extruded core to a gelation solution, the gel-forming material in said core remaining substantially ungelled and gelation occurring only at the surface of said core, and an edible coating adhered to and substantially covering said skin.

2. The product of claim 1 in which said flowable slurry has been stabilized by cooking.

3. The product of claim 1 in which said gel-forming material is an alginate and said gelation solution is a source of alkaline earth ions.

4. A manufactured onion ring comprising extruded heat stabilized core of a flowable slurry of comminuted onion, a cookable binder, water and an ungelled gel-forming material that normally forms a gel upon exposure to a gelation solution a skin surrounding and confining said core, said skin being formed from said gel-forming material by the exposure of said extruded core to a gelation agent, the gel-forming material in said core remaining substantially ungelled and gelation occurring only at the surface of said core, and an edible coating surrounding and in intimate contact with said skin.

5. The product of claim 1 wherein said flowable slurry comprises 10 to 15 weight percent of a mixture including 30 to 60 weight percent wheat flour, 30 to 60 weight percent corn meal, 10 to 30 weight percent sugar and 4 to 10 weight percent of said ungelled, gel-forming material.

6. The product of claim 1 wherein said edible coating is selected from the group consisting of batter and bread coatings and combinations thereof.

7. The product of claim 4 wherein said slurry comprises 85 to 90 weight percent comminuted onions and 10 to 15 weight percent of a mixture comprising 30 to 60 weight percent wheat flour, 30 to 60 weight percent corn meal, 10 to 30 weight percent sugar and 4 to 10 weight percent of said ungelled, gel-forming material.

8. The product of claim 4 wherein said gel-forming material is an alginate and said gelation solution is a source of alkaline earth ions.

9. A method of preparing a food product comprising forming a flowable slurry including comminuted food particles, a cookable binder and an ungelled, gel-forming material, said gel-forming material being capable of forming a gel upon exposure to a gelation agent, extruding said slurry into an elemental shape, exposing said elemental shape to a gelation solution for a time sufficient to form a substantially continuous skin about said extruded flowable slurry, said gel-forming material in the core of said slurry remaining substantially ungelled and gelation occuring only at the surface of said elemental shape and cooking said coated product for a time sufficient to stabilize said flowable slurry.

10. A method in accordance with claim 9 wherein said gel-forming material is an alginate and said gelation solution comprises a source of alkaline earth ions.

11. The method of claim 9 further including applying a substantially continuous edible coating about said skin.

12. The method of claim 11 wherein said edible coating is selected from the group consisting of batter and bread coatings and combinations thereof and said coating is stabilized by said cooking step.

13. A method of manufacturing an onion ring comprising forming a flowable slurry including comminuted onions, a cookable binder and an ungelled, gel-forming material, said gel-forming material being capable of forming a gel upon exposure to a gelation solution, extruding said slurry to form a ring shape, exposing said extruded ring to a gelation agent for a time sufficient to form a skin of said gel-forming material on the outer surfaces of said ring, the gel-forming material in the core of said extruded shape remaining substantially ungelled and gelation occurring only at the surface of said ring, applying a substantially continuous edible coating to the surface of said skin and cooking said coated product for a time sufficient to stabilize said core of said ring.

14. The method of claim 13 wherein said gel-forming material is an alginate and said gelation agent is a source of alkaline earth ions.

15. The method of claim 13 wherein said edible coating is selected from the group consisting of batter and bread coatings and combinations thereof and said coating is stabilized by said cooking step.